United States Patent [19]
Godmaire

[11] 3,974,745
[45] Aug. 17, 1976

[54] PISTON FOR COMPRESSOR

[76] Inventor: Roland A. Godmaire, 224 St. Jacques St., Longueuil, Quebec, Canada

[22] Filed: July 30, 1973

[21] Appl. No.: 383,803

[52] U.S. Cl. .................................. 92/127; 92/248; 92/249
[51] Int. Cl.² ...................... F01B 31/00; F16J 1/00
[58] Field of Search ............ 92/248, 249, 251, 252, 92/127, 126, 181, 172, 162; 417/438, 562; 308/DIG. 1, 4, 9

[56] References Cited
UNITED STATES PATENTS

| | | | |
|---|---|---|---|
| 32,174 | 4/1861 | Batcheller | 92/127 |
| 2,615,769 | 10/1952 | Barnes et al. | 92/252 X |
| 2,623,501 | 12/1952 | Audemar | 92/127 |
| 2,833,602 | 5/1958 | Bayer | 92/127 |
| 3,018,142 | 1/1962 | Warnock, Jr. | 308/9 |
| 3,035,879 | 5/1962 | Hanny et al. | 92/181 X |
| 3,063,764 | 11/1962 | Lowery | 92/253 |
| 3,391,614 | 7/1968 | Kampert et al. | 92/249 X |
| 3,653,303 | 4/1972 | Zurcher | 92/162 |
| 3,663,071 | 5/1972 | Kates | 92/162 |

*Primary Examiner*—Irwin C. Cohen
*Attorney, Agent, or Firm*—Roland L. Morneau

[57] ABSTRACT

A piston for a compressor having at both ends a step-down portion which defines an annular cavity when the piston is mounted in the cylinder, the said cavity being very thin while its length is dependent on the weight and the length of the piston. A rider ring is located at the center of the piston and piston rings are inserted between the rider ring and the step-down portion.

5 Claims, 3 Drawing Figures

PISTON FOR COMPRESSOR

The present invention relates to an improved type of piston particularly used for compressor.

The common type of piston used now-a-days in compressor consists of an elongated cylindrical tube having spaced grooves disposed as follows: a rider ring is located adjacent each end of the piston and two or more piston rings are disposed between the rider rings. The main function of the rider rings is to support the piston at the beginning and at the end of its actuation, that is during the compression and decompression stages. The piston rings provide the sealing power.

More recently, these rings have been made of Tetrafluoroethylene known by the trade mark "Teflon". The results to be expected were a higher sealing efficiency, a lower rate of wear and a reduction of friction.

It is obvious that a clearance or space must be left between the diameter of the piston rings and rider rings and the surrounding cylinder to permit a displacement. The clearance must be computed so as to leave room for the expansion of the metal piston. The higher the temperature expected, the greater must be the clearance when the piston is cool and at rest.

Furthermore, when the clearance is rather important, the piston may be slightly inclined in its cylinder. Consequently the axes of the piston and the cylinder do not coincide in their relative motion, swinging and wobbling motions are produced. These motions increase the friction and consequently the temperature. With the known compressor arrangements, the temperature reaches such high temperatures that, the piston rod, the rod packing the compressor valves became very quickly damaged. In most of known compressors studied, the maximum operating time was less than two months. Under these conditions, the temperature of the compressed material became very high and, in general, the production is limited.

When the rings are made of polytetrafluoroethylene, this material cannot stand the combination of the high temperature and the friction and consequently it erodes rapidly.

Complex cooling systems must be devised to maintain the temperature at a lower level. Even under these conditions, the compressors could not exceed two months of normal operation.

It is an object of the present invention to overcome the above-mentioned disadvantages and in particular to lower the working temperature and increase the time of normal operation.

It is a further object of the invention to create conditions so that the piston will substantially travel concentrically with its surrounding cyliner. It is an object of the invention to provide a piston having a diameter reduced at both ends so as to form a step-down portion of substantially predetermined length and width. It is a further object of the invention to give a minimum clearance between the piston and the cylinder.

It is still a further object of the invention to provide a rider ring located at the median portion of the piston.

It is still a further object of the invention to locate the piston rings between the rider ring and the step-portion at each end of the piston.

The invention will now be described with the help of a drawing wherein.

Figure 1:
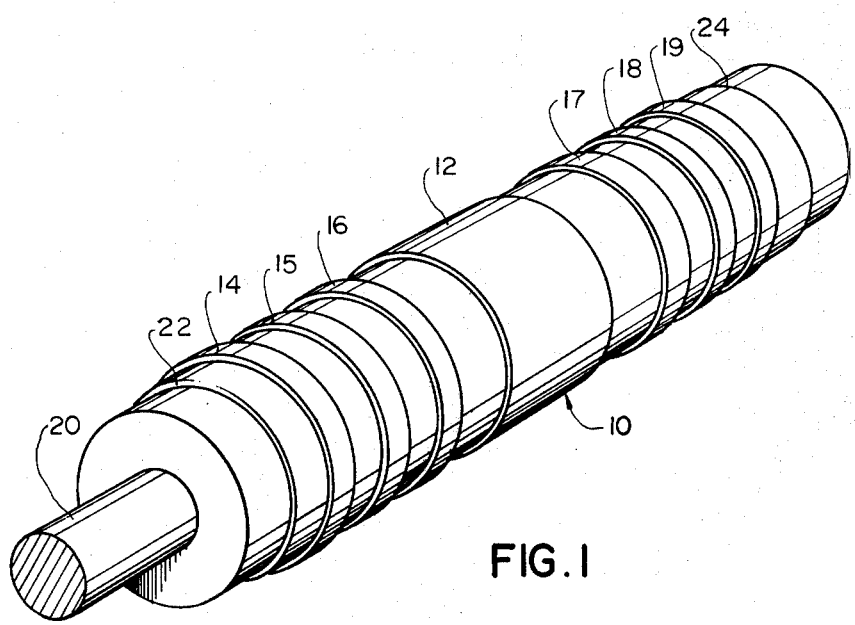
FIG. 1 is a perspective view of a piston with rings according to an embodiment of the invention.
Figure 2:
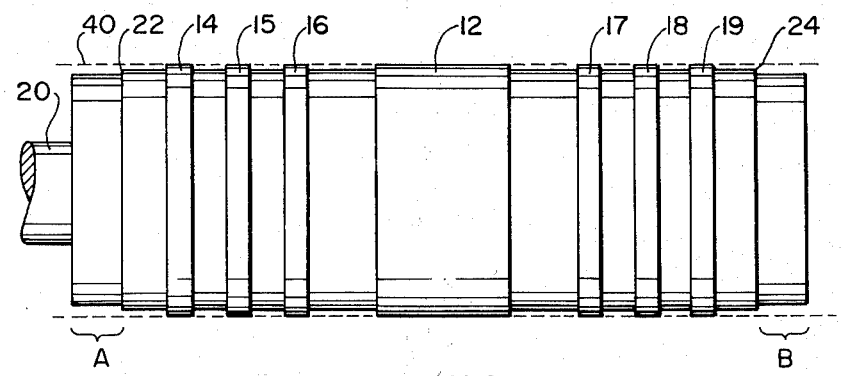
FIG. 2 is a side view of the new piston carrying a rider ring and six piston rings.

FIGS. 1 and 2 show a piston 10 on which are mounted a centrally positioned rider ring 12, six piston rings 14, 15, 16, 17, 18, 19. The piston 10 is mounted on a piston rod 20 which is fitted concentrically with the piston 10. Although all these rings may be made of metal, they are now preferably made of tetrafluoroethylene for eliminating or at least for considerably reducing the needed lubrification. At each end of the piston, step-down portions A and B are cut in the metal of the piston so as to present hard shoulders 22 and 24.

Figure 3:
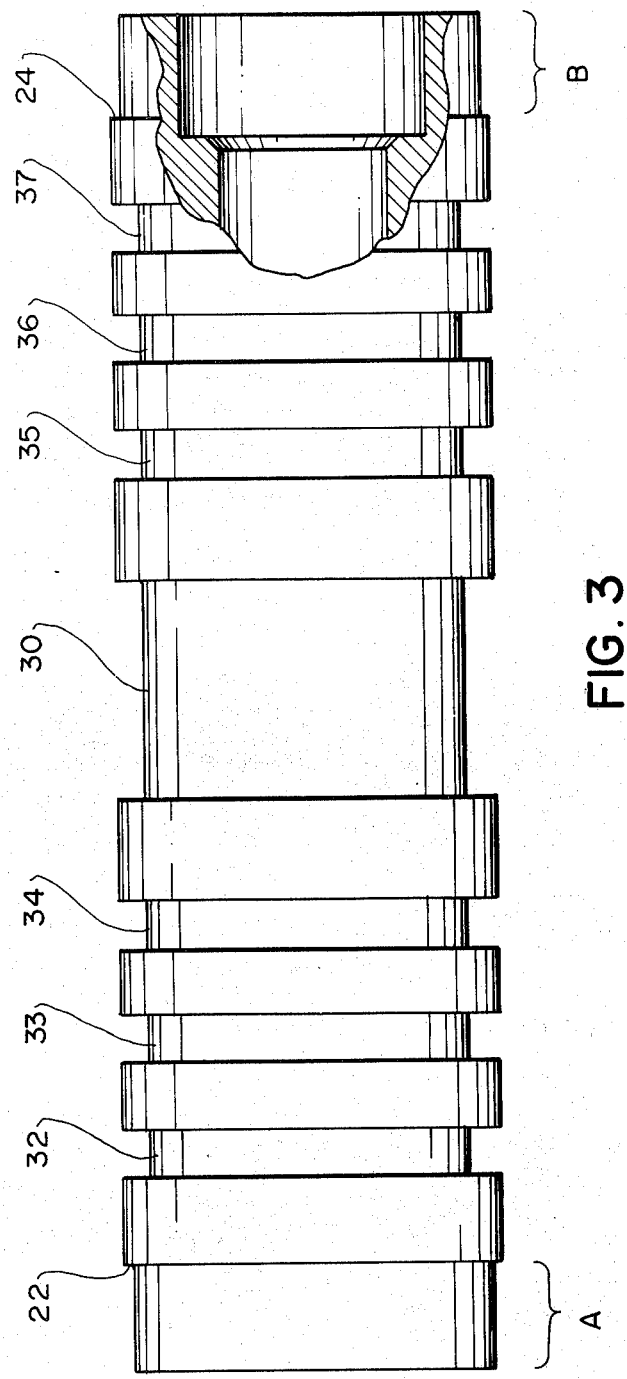
FIG. 3 is a side view of the piston without rings.

The contour of the piston 10 per se is illustrated more clearly in FIG. 3. A cut out portion displays a portion of the cross-section of the piston which is hollow to receive the piston rod.

FIG. 3 shows the rider ring groove 30, grooves 32 to 37 inclusive for receiving piston rings. The rider ring groove 30 is located at the center of the piston and the piston ring grooves 32 to 37 are evenly distributed on each side of the groove 30 and are adapted to receive the piston rings 14 to 19.

As illustrated in FIGS. 1, 2 and 3 both ends of the piston have step-down portions A and B which consist of a reduction of the maximum outer diameter of the piston. These step-down portions of the piston constitute the purport of the invention. They are cut directly into the metallic substance of the piston so as to present shoulders 22 and 24 which will resist the pressure exerted by the compressed gas.

Furthermore, the dimensions of these step-down portions A and B are critical. In order to provide some figures, it may be interesting to provide some explanations for the desired results. In practically all compressors, the piston (or pistons) travels horizontally. Therefore, they tend, by gravity, to rest on the lower part of their periphery. When the back and forth movement increases and on account of the exerted pressure on all its periphery, the piston will move off its axial direction. The extent of the transverse displacement of the piston varies with the clearance between the piston, the piston rings, the rider ring and the surrounding cylinder.

It has been considered that by providing a step-down portion at each end of the piston, a gas turbulence fills the cavity created by the step-down portions A and B and supports the piston so that it will remain concentric with the surrounding cylinder. Although this explanation has not been analysed by scientific methods, it appears to be a logical explanation for the considerably improved results obtained which will be stated later.

By using this explanation, it is possible to determine the length of the step-down portions A and B. It will depend on the weight of the piston, the piston rod and the diameter of the piston. The following empirical formula has been devised:

$$L = \frac{8 \times D}{Wp + \frac{Wr}{2}}$$

wherein $L$ = length of each step-down portion (inches)
$D$ = diameter of the piston (inches)
$Wp$ = weight of the piston (pounds)
$Wr$ = weight of the piston rod (pounds)

The following table 1 provides four examples:

| Diameter of piston (inches) | Weight of piston (lbs) | Weight of piston rod (lbs) | Length of step-down portion (inc.) |
|---|---|---|---|
| 3-3/8 | 19 | 50 | .625 |
| 4 | 26 | 50 | .625 |
| 7-1/2 | 24 | 50 | 1.250 |
| 18 | 45 | 150 | 1.250 |

It is understood that good results can be obtained without adhering exactly to these lengths (L). A tolerance of ± 10% shows no appreciable difference under normal use and in general ± 25% is, in many cases, acceptable. However, the selected length should be preferably slightly longer than shorter. Apparently when it is too long, the cavity does not have sufficient time to fill up with gas. The approximation of this formula depends on the fact that it is an empirical formula.

Various thicknesses of the step-down portions have been considered. In order to obtain the desired flow of gas or turbulence in the cavity, the thickness should remain within stricter limits. The thickness which gave excellent results for the piston tested was around 0.010 inch.

The fact that these step-down portions apparently make the piston float, a considerable reduction of friction wear and temperature is observed. In fact, contrary to previous known pistons, it is possible to give to the piston a very small clearance with the cylinder because the temperature remains relatively low. Therefore, a much smaller expansion of the metal needs to be foreseen. Also, the fact that a great amount of pressure is releaved from the piston rings because it is absorbed by the shoulders A & B, there is a much smaller wear of the piston rings because the piston does the work. Therefore a much greater quantity of gas is conveyed per unit of time.

It is so true that more gas is conveyed, that the lift of the suction and discharge valves must be increased so that the piston will not lack material to be compressed.

Another advantage resulting from the low temperature consists of a longer lifetime for the valves, the piston rings, the rider ring and the rod packing because the temperature remains much lower than it has been known with usual pistons.

In addition to the increased efficiency and production caused by the step-down portions and the small clearance between the piston and the cylinder, the lifetime of the piston is increased considerably. As explained before, the rider rings were usually located adjacent both ends of the piston and since the characteristics of "Teflon" are known, they are made of this material. Although this material is known for its low coefficient of friction, it softens at high temperature and erodes easily. These disadvantages were particularly intolerable because the rider rings were directly exposed to the side pressures such as the shoulders 22 and 24 of FIGS. 2 and 3. In the case where the rider rings were made of metal, the increased friction and temperature are important drawbacks.

An additional advantage of the present arrangement consists in having the rider ring at the center because it is protected from direct gas pressure and carbonic or other residues. The tetrafluoroethylene material acts essentially as a sealing element and not as a compressor element.

Dimension of a typical cylinder according to the invention

A piston such as shown in FIGS. 2 and 3 for an alternative compressor can have the following dimensions:

| | | |
|---|---|---|
| Length of the piston: | 11 | inches |
| External diameter of the piston: | 3.356 | inches |
| External diameter of the piston rod: | 1.251 | inches |
| Length of the step-down portion: | 0.750 | inch |
| Depth of the step-down portion: | 0.010 | inch |
| Width of the piston ring: | .375 | inch |
| Width of the rider ring: | 2.000 | inches |
| Depth of the piston and rider ring grooves: | 0.303 | inch |

Depending upon the material of the piston and the temperature expected, the expansion of the diameter of the piston can be predetermined. For example, in the case of the piston of FIG. 2, an approximate clearance of 0.009 inch is left between the outer diameter of the piston and the inner diameter of the cylinder 40. This clearance leaves a depth of 0.019 inch in the cavity of the step-down portion.

The following table provides additional details for the material compressed, and of the piston as well as the temperatures and pressures obtained:

| Material used | Temp in/out | Material of the piston | Press | Coolant |
|---|---|---|---|---|
| Hydrogene | 150/175 | aluminium | 400–500 lbs | Water |
| Hydrogene | 175/190 | cast iron | 500–900 lbs | Water |
| Ethylene | 150/180 | Aluminium | 250–550 lbs | Water |

In all these cases the temperature of the cooling water remained around 80°F.

With these favorable conditions, the piston of a compressor was tested. The parts appeared practically without wear and the production had been doubled. The same compressor used with its original piston, as purchased from a reliable company could operate during a maximum of two months. It is well known presently in the trade that the cost of maintenance of compressor is very high on account of the pistons which must be frequently repaired.

With the new arrangement, not only the maintenance is reduced but also the efficiency is increased.

For example, compressor which was bought to produce 16,000 pounds per hour has been boosted up to 34,000 pounds and even up to 44,000 pounds per hour by substituting a piston according to the invention and by increasing the inlet and outlet of the gas.

Considering that the piston, according to the present invention, has smaller clearances than the comparable ones presently on the market, it should be pointed out that its axis must be precise within a closer tolerance and preferably less than 0.0015 inch.

The above example describes a piston having six piston rings but the number of rings is not essential, but should be preferably located between the step-down portions and the rider ring.

Even if the compressor comprises more than one piston, each piston is designed according to the invention.

I claim:

1. In combination, a self-centering imperforate metal ring-type one-piece annular piston sleeve and a piston rod axially mounted through said sleeve, said sleeve being provided with a centrally positioned wide circumferential rider ring groove adapted to contain a rider ring therein and a plurality of piston ring grooves adapted to contain piston rings therein and disposed on opposite sides of said rider ring groove, the said sleeve and rod being adapted to be disposed in a cylindrical chamber of a gas compressor for compressing gas at both ends thereof, the said piston sleeve being characterized by a step-down portion at each end of the said sleeve constituted of a square-shouldered annular recess around the periphery of the end surface of the sleeve, the said square-shouldered recess defining, in cross-section, two adjacent perpendicular lines, one of said lines corresponding to the depth of the said recess is 0.01 inch within a tolerance less than ± 10% and the other of said lines is co-axial with the axis of the sleeve and is defined by the following formula:

$$L = \frac{8 \times D}{Wp + \frac{Wr}{2}}$$

wherein,

L = length of each step-down portion (inch) within a tolerance of ± 25%

D = outer diameter of the piston sleeve (inch)

Wp = weight of the pisto sleeve (pounds)

Wr = weight of the piston rod (pounds)

whereby, a compressed gas forwardly entering the said recess, under normal operation, abruptly hits the rear wall of the recess and provides a fluid cushion in said recess to permit the piston sleeve to slidedly float within the cylindrical chamber and maintain a concentric relationship.

2. In combination, a compressor, a horizontal cylindrical chamber within said compressor, a self-centering imperforate metal one-piece ring-type annular piston sleeve mounted in said cylindrical chamber, said sleeve being provided with a centrally positioned wide circumferential rider ring groove and rider ring therein and a plurality of piston ring grooves with piston rings therein disposed on opposite sides of said rider ring, a piston rod axially mounted through said sleeve, both ends of said piston sleeve being obturated for compressing the gas adapted to be located in said cylindrical chamber, the said piston sleeve being characterized by a step-down portion at each end of the said sleeve constituted of a square-shouldered annular recess around the periphery of the end surface of the sleeve, the said square-shouldered recess defining, in cross-section, two adjacent perpendicular lines, one of said lines corresponding to the depth of the said recess is 0.01 inch within a tolerance less than ± 10% and the length of the other of said lines is co-axial with the axis of the sleeve and is defined by the following formula:

$$L = \frac{8 \times D}{Wp + \frac{Wr}{2}}$$

wherein,

L = length of each step-down portion (inch within a tolerance of ± 25%

D = outer diameter of the piston sleeve (inch)

Wp = weight of the piston sleeve (pounds)

Wr = weight of the piston rod (pounds)

the outer diameter of the said piston sleeve being so dimensioned so as to leave a peripheral clearance of 0.01 ±0.002 inch with the said cylindrical chamber, whereby, a large proportion of the compressed gas forwardly entering the said recess, under normal operation, hits the rear wall of the recess and provides a fluid cushion in said recess to permit the piston sleeve to slidedly float within the cylindrical chamber and maintain a concentric relationship.

3. The combination as recited in claim 2, wherein the external diameter of the said rings being determined to exceed the outer diameter of said sleeve by 0.009 ± 0.0018 inch.

4. The combination as recited in claim 3, wherein all the rings are coated with tetrafluoroethylene.

5. The combination as recited in claim 3, wherein the rings are constituted of tetrafluoroethylene.

* * * * *